United States Patent [19]

Hatanaka et al.

[11] 4,214,559
[45] Jul. 29, 1980

[54] ORIENTATION OF TORCH OPENINGS FOR PRECHAMBER ENGINE

[75] Inventors: Toru Hatanaka, Urawa; Yoshitoku Iizuka, Toda, both of Japan

[73] Assignee: Honda Giken Kogyo Kabushiki Kaisha, Tokyo, Japan

[21] Appl. No.: 5,314

[22] Filed: Jan. 22, 1979

Related U.S. Application Data

[63] Continuation-in-part of Ser. No. 780,318, Mar. 23, 1977, Pat. No. 4,144,848.

[30] Foreign Application Priority Data

Apr. 1, 1976 [JP] Japan ................... 51-35182

[51] Int. Cl.² ............................................. F02B 23/06
[52] U.S. Cl. ........................................ 123/293; 123/260
[58] Field of Search ............ 123/75 B, 191 S, 191 SP, 123/32 L, 32 K, 32 SP, 32 ST

[56] References Cited

U.S. PATENT DOCUMENTS 3,890,942  6/1975  Date ........................ 123/191 SP

FOREIGN PATENT DOCUMENTS

| | | | |
|---|---|---|---|
| 24807 | 11/1956 | Fed. Rep. of Germany | 123/32 K |
| 2142951 | 3/1973 | Fed. Rep. of Germany | 123/32 L |
| 1202585 | 1/1960 | France | 123/32 L |
| 522673 | 4/1955 | Italy | 123/32 L |
| 167481 | 6/1959 | Sweden | 123/32 K |
| 708886 | 5/1954 | United Kingdom | 123/32 K |

*Primary Examiner*—Ronald H. Lazarus
*Attorney, Agent, or Firm*—Lyon & Lyon

[57] ABSTRACT

An internal combustion piston engine has a prechamber or auxiliary chamber associated with each main combustion chamber and connected thereto by a plurality of torch openings. Ignition of a relatively rich mixture in the auxiliary chamber causes flames to be projected through the torch openings to ignite the relatively lean mixture in the main combustion chamber. A plurality of torch openings are provided between the auxiliary combustion chamber and the main combustion chamber and are positioned such that they direct torch flame both toward the valves in the main combustion chamber as well as towards the region of the main combustion chamber remote from the valves.

3 Claims, 6 Drawing Figures

ORIENTATION OF TORCH OPENINGS FOR PRECHAMBER ENGINE

RELATED APPLICATION

This application is a continuation-in-part of U.S. patent application Ser. No. 780,318 filed Mar. 23, 1977 which issued as U.S. Pat. No. 4,144,848 on Mar. 20, 1979.

BACKGROUND OF THE INVENTION

This invention relates to internal combustion spark ignition piston engines of the type employing a prechamber or auxiliary chamber adjacent each main combustion chamber, the chambers being connected by a torch opening. Relatively rich mixture is ignited in the auxiliary chamber at the end of the compression stroke, and this causes a flame to be projected into the main combustion chamber to ignite a relatively lean mixture. An engine of this general type is disclosed in the Date et al U.S. Pat. No. 3,830,205 granted Aug. 20, 1974.

Internal combustion engines of this type operate advantageously for reduction of the $NO_x$ content in the exhaust gases, and for greater reduction of $NO_x$ the lean mixture supplied to the main combustion chamber is so lean as to be within a range of unassured or impossible spark ignition. Prior to this invention, a single torch opening has been provided near one side of the main combustion chamber for projection of a flame across the chamber to the other side. This system has a disadvantage when the mixture is extremely lean because the rate of flame propagation is low. At the end of the compression stroke of the piston, particularly under operating conditions close to full open throttle where the effective compression ratio is great, the lean mixture located in a region far away from the torch opening is affected by the pressure rise caused by the ignition of the mixture in the neighborhood of the torch opening so as to be adiabatically compressed to a high temperature. It self-ignites to burn abnormally to develop knocking, before the torch flame reaches the region in question. This self-ignition is likely to occur at the end of the compression stroke in the neighborhood of the exhaust valve which is generally the hottest spot in the main combustion chamber.

In order to prevent the abnormal burning and possible knocking it is necessary for the torch flame to reach the region before self-ignition occurs. While this result may be accomplished by simply placing the single torch passage so that the direction of the flame is toward the exhaust valve, such an arrangement retards the ignition of the lean mixture in the direction of the main intake valve, with the result that the overall combustion in the main combustion chamber is poor. Furthermore, because the rate of flame propagation is very slow in the lean mixture, the single torch opening has been located as close to the exhaust valve as possible and near the center of the main combustion chamber. However, this retards the propagation of flame to portions of the lean mixture located remote from the exhaust valve, also bringing about poor combustion overall.

It is therefore an important object of this invention to provide a torch flame ignition system for a very lean mixture which minimizes self-ignition and knocking even when the engine is under full load. This object is achieved by providing a plurality of torch openings between the auxiliary combustion chamber and the main combustion chamber, and positioning them so that they direct torch flames toward both of the valves in the main combustion chamber as well as directing another torch flame toward a region of the main combustion chamber remote from said valves.

Other objects and advantages will appear hereinafter.

Figure 1:
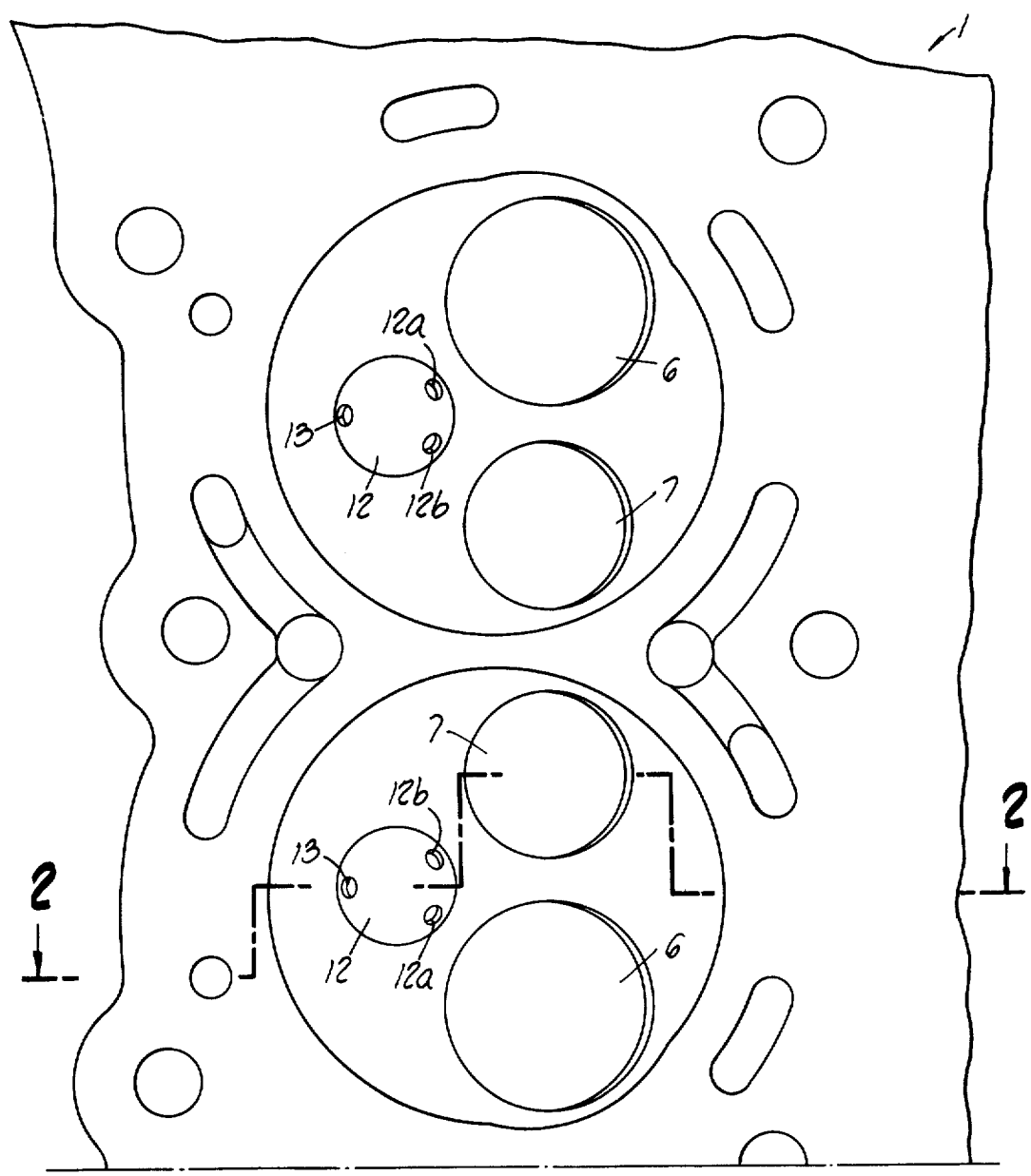
FIG. 1 is a bottom view of a cylinder head of an internal combustion engine, and constituting a preferred embodiment of this invention.

Referring to the drawings, the internal combustion spark ignition piston engine generally designated 1 is intended for use in automobiles and the like. The engine 1 employs a plurality of pistons 2 reciprocating within cylinders 3 formed within a cylinder block 4. The cylinder head 5 cooperates with the cylinder block 4 and each piston 2 to form a main combustion chamber 8 provided with a main intake valve 6 and an exhaust valve 7. A relatively lean air-fuel mixture is supplied to each main combustion chamber 8 through each main intake valve 6, and a relatively rich air-fuel mixture supplied through an auxiliary intake valve 9 to an auxiliary combustion chamber 11. A spark plug 10 ignites the mixture in the auxiliary combustion chamber 11 at the end of the compression stroke of the piston 2, and this projects flames through the torch openings 12a, 12b, and 13 to ignite the lean mixture in the main combustion chamber 8.

The main combustion chamber 8 is wedge shape or semi-spherical shape with its deepest portion located in the neighborhood of the axis X—X of the cylinder 3. The auxiliary combustion chamber 11 is formed within a hollow cylindrical body 12 made of heat resisting metal of relatively thin wall thickness. The bottom wall of the body 12 is semi-spherical and projects into the main combustion chamber 8 at one side of the axis X—X.

A first torch opening 12a and a second torch opening 12b are formed in the bottom wall of the cylindrical body 12, the first torch opening 12a being positioned to direct a flame toward the main intake valve 6 and the second torch opening 12b being positioned to direct a flame toward the exhaust valve 7. The third torch opening 13 is also positioned in the bottom wall of the cylindrical body 12 remote from the torch openings 12a and 12b. The flames projected from the torch openings 12a and 12b reach portions of the main combustion chamber 8 before self-ignition occurs by high temperatures caused by adiabatic compression, and hence knocking is minimized. The third torch opening 13 which projects a flame in the opposite direction improves the ignition and therefore the combustion of mixture in the portions of the main combustion chamber 8 most remote from the valves 6 and 7.

Tests have shown that the torch openings 12a and 12b should be located within one-fourth of the bore diameter of the cylinder 3 from the axis X—X. Furthermore, it has been determined that, with the axis of the cylindrical member 12 as an apex, the angle between any two of the three torch openings should be between 90° and 180°.

It has been confirmed that this invention is particularly effective for application to engines wherein the total cross sectional area of all of the torch openings is from 0.04 to 0.20 square centimeters for each cubic centimeter of the volume of the auxiliary combustion chamber. Also, the volume of the auxiliary combustion chamber should be from 0.05 to 0.12 of the total volume of both chambers when the piston is at top dead center position.

In operation, flame produced in the auxiliary combustion chamber 11 is projected through the torch opening 12b in the direction of the exhaust valve 7 and acts effectively to prevent self-ignition and consequent knocking that is likely to occur in that region. Flame is also projected through the torch opening 12a in the direction of the main intake valve 6 and improves the ignition and therefore the combustion of the mixture in that area. Furthermore, flame is projected through the auxiliary torch opening 13 in the opposite direction and improves the ignition and therefore the combustion of the mixture in that area.

Figure 2:
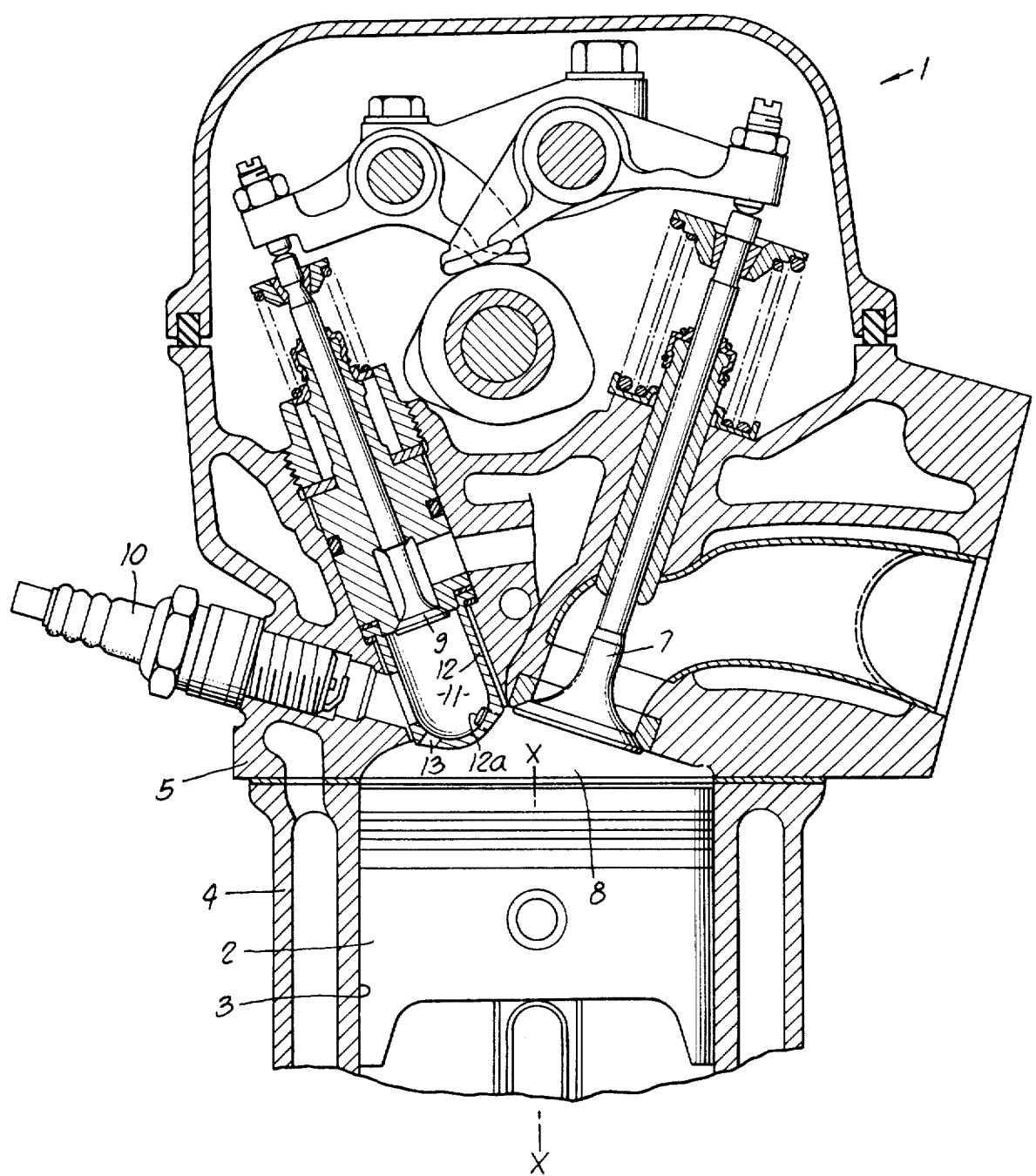
FIG. 2 is a sectional side elevation taken substantially on the lines 2—2 as shown in FIG. 1.
Figure 3:
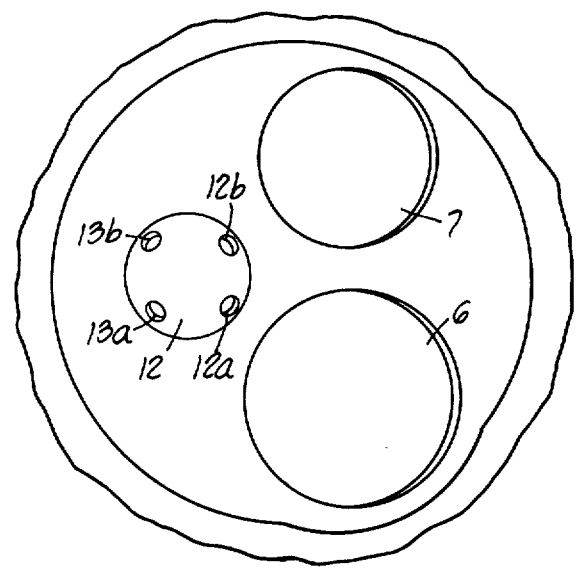
FIG. 3 is a view similar to FIG. 1 showing a modification.

The modified form of the invention shown in FIG. 3 employs the same pair of torch openings 12a and 12b, but instead of one auxiliary torch opening 13, a pair of such openings 13a and 13b are employed. The total sectional area of all of the torch openings should be from 0.04 to 0.20 square centimeter for each cubic centimeter of the volume of the auxiliary combustion chamber 11. This form of the invention is particularly well suited for engines of medium volume, whereas the form of the invention shown in FIGS. 1 and 2 is used for engines of small volume.

Figure 4:
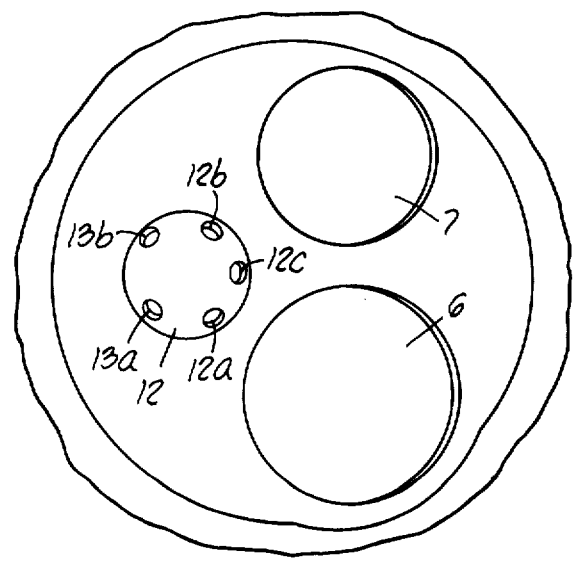
FIG. 4 is a view similar to FIG. 1 showing a second modification.

In the second modified form of the invention shown in FIG. 4, the torch openings 12a and 12b and 13a and 13b are the same as previously described, but in addition fifth torch opening 12c is placed between the torch openings 12a and 12b and oriented so that its flame is directed between the valves 6 and 7 toward the remote portion of the wall of the cylinder 3. The total sectional area of all of the torch openings should be between 0.04 and 0.20 square centimeter for each cubic centimeter of the volume of the auxiliary combustion chamber 11. This form of the invention is particularly adapted for engines with relatively large volumes.

Figure 6:
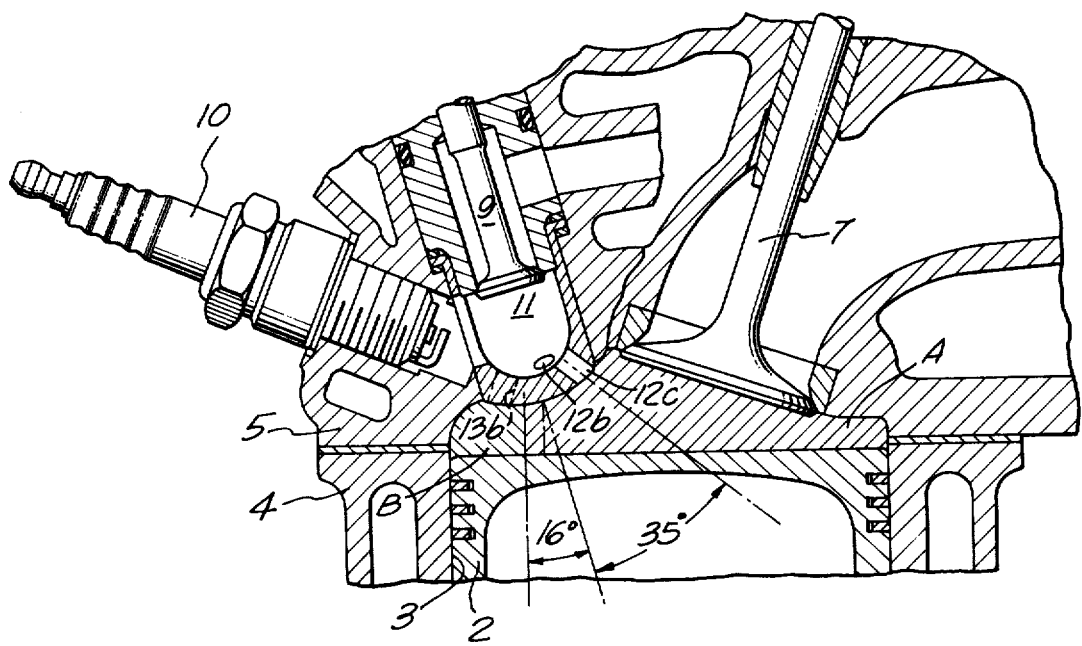
FIG. 6 is a partial sectional side elevation taken substantially on the lines 6—6 as shown in FIG. 5.
Figure 5:
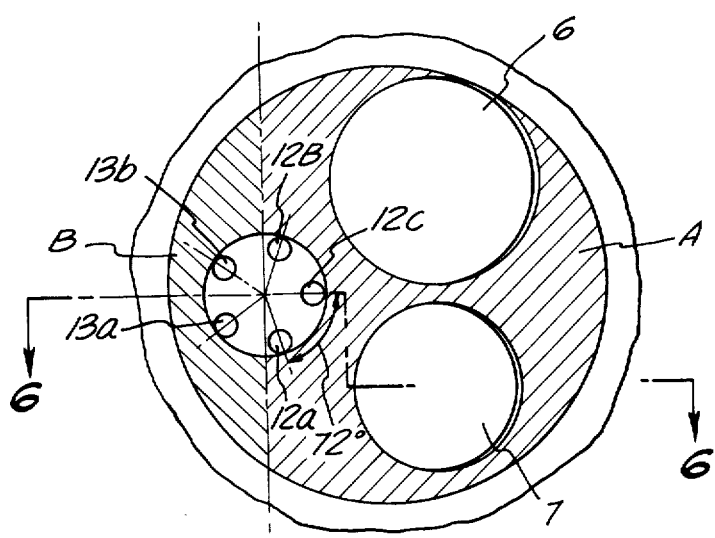
FIG. 5 is a view similar to FIG. 1 showing a preferred embodiment of this invention.

As shown in FIGS. 5 and 6, in a preferred embodiment of this invention the total cross sectional area of the torch openings for combustion in the main region of the main combustion chamber 8, that cross sectional area cross-hatched and marked with the letter "A", is larger than the total cross sectional area of the torch openings for combustion in the back region, that portion of the cross sectional area marked with the letter "B". Such a configuration provides for combustion of the mixture in the entire main combustion chamber 8 which terminates at substantially the same time. If, for example, the combustion in the main region "A" of the main combustion chamber 8 continues to take place after completion of the combustion in the back region "B", knocking is likely to occur in the vicinity of the peripheral wall of the cylinder 3 in region "A". This knocking results from self-ignition of the mixture in the vicinity of the peripheral wall of cylinder 3 caused by the influence of an increased high pressure, before the mixture in the vicinity of the peripheral wall of cylinder 3 in region "A" is burned by flame propagation initiating from the torch flame. Such knocking will deteriorate the drivability and increase the emissions from the vehicle.

All of the torch openings, 12a, 12b, 12c, 13a and 13b are preferably provided in the bottom wall of the auxiliary combustion chamber 11. Provision of the torch openings in the bottom wall of the auxiliary combustion chamber 11 makes it possible to eliminate excessive irregularity from the configuration of the main combustion chamber walls which includes the bottom of the auxiliary combustion chamber. Accordingly, no concentration of local heat load will develop in the main combustion chamber 8.

As shown best in FIG. 5, three torch openings, 12a, 12b and 12c are directed towards a main region "A" of the main combustion chamber 8 while torch openings 13a and 13b are directed towards the back region "B" of the main combustion chamber 8. In an engine where the auxiliary combustion chamber 11 is locally offset to one side of the main combustion chamber 8, as is the case in this invention, in order to effectively ignite and burn by the torch flame the lean mixture in the main combustion chamber 8 having a low flame propagation, it is necessary to increase the ejection speed of the torch flame, thereby increasing the reach of the torch flame as much as possible, while ensuring that the torch flame reaches the portion of the peripheral wall of the cylinder 3. For this purpose, the torch openings are required to be smaller to some extent in the hole diameter. Where a single torch opening is provided, although the injection speed of the torch flame may be increased, a sufficient spread of flame is not obtainable. Accordingly, in order to burn the lean mixture in the main combustion chamber 8 effectively, it is essential that the flame propagation progress uniformly into every portion of the main combustion chamber 8.

As further shown in FIG. 5, the torch openings 13a and 13b directed towards the back region "B" of the main combustion chamber 8 are arranged symmetrically and substantially equadistant with respect to the center line of the auxiliary combustion chamber through which line 6—6 is drawn. The arrangement by which the two torch openings 13a and 13b are placed at an angle to the center line of the auxiliary combustion chamber 11 will prevent gasket damage by torch flame which might be achieved if the torch opening were located too close to the cylinder head gasket. Further, this spacing will ensure that the back region "B" of the main combustion chamber 8 will burn uniformly.

The torch openings 12a, 12b, 12c, 13a and 13b are preferably spaced substantially equadistant from each other. The bottom of the auxiliary combustion chamber 11, including the torch openings, is exposed to high temperature. Therefore, if the distance between any two torch openings is not substantially equal it is possible that the heat load will concentrate and thereby damage such openings.

As set forth above, an increase in engine volume, that is, an increase in the volume of each main combustion chamber 8, may be accompanied by an increase in the number of torch openings; however, the total number of such torch openings must be limited. Although it may seem desirable to provide a large number of torch openings in order to accomplish uniform combustion of the mixture throughout the main combustion chamber 8, the result in that case is that the flame is dispersed in various directions and its traveling distance is reduced in each direction. It has been found that larger numbers of torch openings are clearly not desirable in the case of extremely lean mixture which has a slow rate of flame propagation. In other words, only a few torch openings should be employed and they should be oriented to project their flames in the right directions. It is no solution to make the auxiliary combustion chamber 11 larger in volume so as to produce longer flame jets, because such is not desirable from the viewpoint of fuel consumption.

As is seen from the foregoing, in accordance with this invention at least two torch openings are employed, one being directed toward the main intake valve and the other toward the exhaust valve, and on the opposite side of the auxiliary chamber at least one auxiliary torch opening is provided. This construction is effective to insure burning of the lean mixture throughout the main combustion chamber to prevent self-ignition and knocking.

Having fully described our invention, it is to be understood that we are not to be limited to the details herein set forth but that our invention is of the full scope of the appended claims.

I claim:

1. In an internal combustion engine, the combination of walls including a movable piston forming a main combustion chamber, said main combustion chamber having a wedge shaped apex near the extended axis of said piston, an intake valve and an exhaust valve each having a head portion projecting into said main combustion chamber, walls forming an auxiliary combustion chamber, said auxiliary combustion chamber being positioned within said engine adjacent said main combustion chamber apex and the bottom wall of said auxiliary combustion chamber projecting into said main combustion chamber, at least three torch openings in said bottom wall establishing communication between said chambers, means for igniting a mixture in said auxiliary combustion chamber to cause flames to project through said torch openings to ignite a mixture in said main combustion chamber, the first of said torch openings being positioned to direct a flame near said intake valve, the second of said torch openings being positioned to direct a flame near said exhaust valve, the third of said torch openings being positioned opposite said first and second torch openings to direct a flame toward a region of said main combustion chamber remote from said valves, all of said torch openings being provided in the bottom wall of said auxiliary combustion chamber, the total cross sectional areas of said torch openings being from 0.04–0.20 square centimeters for each cubic centimeter of volume of said auxiliary combustion chamber, and the total cross sectional area of the first and second torch openings being larger than that of third torch opening.

2. In an internal combustion engine, the combination of walls including a movable piston forming a main combustion chamber, said main combustion chamber having a wedge shaped apex near the extended axis of said piston, an intake valve and an exhaust valve each having a head portion projecting into said main combustion chamber, walls forming an auxiliary combustion chamber, said auxiliary combustion chamber being positioned within said engine adjacent said main combustion chamber apex and the bottom wall of said auxiliary combustion chamber projecting into said main combustion chamber, a plurality of torch openings establishing communication between said chambers, means for igniting a mixture in said auxiliary combustion chamber to cause flames to project through said torch openings to ignite a mixture in said main combustion chamber, a first torch opening being positioned to direct a flame near said intake valve, a second torch opening being positioned to direct a flame near said exhaust valve, third and fourth torch openings being positioned opposite said first and second torch openings to direct a flame toward a region of said main combustion chamber remote from said valves, said third and fourth torch openings being substantially symmetrically positioned with respect to the axis of the cylindrical auxiliary combustion chamber, a fifth torch opening being positioned to direct a flame between said intake valve and said exhaust valve, all of said torch openings being provided in the bottom wall of said auxiliary combustion chamber, the total cross sectional areas of said torch openings being from 0.04–0.20 square centimeters for each cubic centimeter of volume of said auxiliary combustion chamber, and the cross sectional area of said first, second and fifth torch openings being larger than the cross sectional area of said third and fourth torch openings.

3. In an internal combustion engine, the combination of walls including a movable piston forming a main combustion chamber, said main combustion chamber having a wedge shaped apex near the extended axis of said piston, a main intake valve and an exhaust valve each having a head portion projecting into said main combustion chamber, walls forming a substantially cylindrical auxiliary combustion chamber, said auxiliary combustion chamber being positioned within said engine adjacent said main combustion chamber apex and the bottom wall of said auxiliary combustion chamber projecting into said main combustion chamber, a plurality of torch openings establishing communication between said chambers, means for igniting a rich mixture in said auxiliary combustion chamber to cause flames to project through said torch openings to ignite a mixture in said main combustion chamber, means for delivery of a lean mixture to said main combustion chamber through said main intake valve, means including an auxiliary intake valve for delivery of a rich mixture of said auxiliary combustion chamber, a first torch opening being positioned to direct a flame near said main intake valve, a second torch opening being positioned to direct a flame near said exhaust valve, third and fourth torch openings being positioned opposite said first and second torch openings to direct a flame toward a region of said main combustion chamber remote from said valves, said third and fourth torch openings being substantially symmetrically positioned with respect to the axis of the cylindrical auxiliary combustion chamber, a fifth torch opening being positioned to direct a flame between said main intake valve and said exhaust valve, all of said torch openings being provided in the bottom wall of said auxiliary combustion chamber, the total cross sectional areas of said torch openings being from 0.04–0.20 square centimeters for each cubic centimeter of volume of said auxiliary combustion chamber, and the total cross sectional area of said first, second and fifth torch openings being larger than that of the third and fourth torch openings.

* * * * *